US009992765B2

(12) United States Patent
Park et al.

(10) Patent No.: US 9,992,765 B2

(45) Date of Patent: Jun. 5, 2018

(54) METHOD FOR TRANSMITTING AND RECEIVING A FRAME IN A WIRELESS LAN SYSTEM AND APPARATUS FOR SUPPORTING SAME

(71) Applicant: LG ELECTRONICS INC., Seoul (KR)

(72) Inventors: Jong Hyun Park, Anyang-si (KR); Hyang Sun You, Anyang-si (KR); Ill Soo Sohn, Anyang-si (KR); Bong Hoe Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 200 days.

(21) Appl. No.: 14/358,681

(22) PCT Filed: Nov. 19, 2012

(86) PCT No.: PCT/KR2012/009773

§ 371 (c)(1),
(2) Date: May 15, 2014

(87) PCT Pub. No.: WO2013/077600

PCT Pub. Date: May 30, 2013

(65) Prior Publication Data

US 2014/0314056 A1 Oct. 23, 2014

Related U.S. Application Data

(60) Provisional application No. 61/562,417, filed on Nov. 21, 2011.

(51) Int. Cl.

| | |
|---|---|
| ***H04W 72/04*** | (2009.01) |
| ***H04B 7/26*** | (2006.01) |
| *H04W 84/12* | (2009.01) |

(52) U.S. Cl.

CPC .......... *H04W 72/04* (2013.01); *H04B 7/2643* (2013.01); *H04B 7/2656* (2013.01); *H04W 84/12* (2013.01)

(58) Field of Classification Search

None

See application file for complete search history.

(56) References Cited

U.S. PATENT DOCUMENTS

| | | | | |
|---|---|---|---|---|
| 9,161,362 | B1 * | 10/2015 | Banerjea | H04B 7/0697 |
| 2007/0161364 | A1 * | 7/2007 | Surineni | H04W 52/0225 455/343.4 |

(Continued)

FOREIGN PATENT DOCUMENTS

| | | |
|---|---|---|
| KR | 1020040110206 | 12/2004 |
| KR | 1020060012754 | 2/2006 |

(Continued)

OTHER PUBLICATIONS

PCT International Application No. PCT/KR2012/009773, International Search Report dated Mar. 19, 2013, 1 page.

*Primary Examiner* — Charles C Jiang

*Assistant Examiner* — George Atkins, Jr.

(74) *Attorney, Agent, or Firm* — Lee, Hong, Degerman, Kang & Waimey

(57) ABSTRACT

The present invention relates to a method for transmitting and receiving a frame performed by an AP in a wireless communication system. The method includes the steps of: transmitting a PST message providing instructions to transmit a frame to at least one STA; and receiving frames from a first STA and a second STA. The PST message includes first subband information indicating a first subband in which a first frame is transmitted from the first STA and second subband information indicating a second subband in which a second frame is transmitted from the second STA.

10 Claims, 12 Drawing Sheets

Frequency
PSTT1 PSTT2 PSTT3 PSTT4 PSTT5
Channel bandwidth reduction
Subband 4
Subband 3
Subband 2
Subband 1 (Primary)
STA1 STA2 STA3 STA4 STA5 STA6
Time

(56) References Cited

U.S. PATENT DOCUMENTS

2007/0248046 A1 * 10/2007 Khan .................... H04W 72/04 370/329
2009/0067397 A1 * 3/2009 Seok ....................... H04L 41/00 370/338
2010/0034182 A1 * 2/2010 Sekiya .................. H04W 88/02 370/338
2010/0062725 A1 * 3/2010 Ryu .................. H04W 52/0251 455/69
2010/0080187 A1 * 4/2010 Papasakellariou .... H04L 5/0051 370/329
2011/0194644 A1 * 8/2011 Liu ....................... H04L 5/0023 375/295
2011/0222486 A1 * 9/2011 Hart ........................ H04L 5/001 370/329
2012/0170565 A1 * 7/2012 Seok ................... H04L 27/2602 370/338
2013/0188567 A1 * 7/2013 Wang .................... H04L 5/0094 370/329
2017/0118604 A1 * 4/2017 Kim ........................ H04W 4/08

FOREIGN PATENT DOCUMENTS

KR 1020060109177 10/2006
KR 1020080002296 1/2008
WO 2011025146 3/2011
WO WO/2011025146 A2 * 3/2011 ............... H04B 7/04

* cited by examiner

METHOD FOR TRANSMITTING AND RECEIVING A FRAME IN A WIRELESS LAN SYSTEM AND APPARATUS FOR SUPPORTING SAME

CROSS-REFERENCE TO RELATED APPLICATIONS

This application is the National Stage filing under 35 U.S.C. 371 of International Application No. PCT/KR2012/009773, filed on Nov. 19, 2012, which claims the benefit of U.S. Provisional Application Ser. No. 61/562,417 filed on Nov. 21, 2011, the contents of which are all hereby incorporated by reference herein in their entirety.

BACKGROUND OF THE INVENTION

Field of the Invention

The present invention relates to wireless communications, and more specifically, to a method of transmitting and receiving a frame in a wireless LAN system and an apparatus supporting the same.

Related Art

With the growth of information communication technology, a variety of wireless communication techniques are being developed. Among others, wireless local area network (WLAN) is a technology that allows for wireless access to the Internet in home or business or in a specific service area using a portable terminal such as personal digital assistant (PDA), laptop computer, or portable multimedia player (PMP) based on radio frequency technology.

Conventional HT (High Throughput) and VHT (Very High Throughput)-supportive WLAN systems, in contrast to using 2 GHz and/or 5 GHz 20/40/80/160/80+80 MHz bandwidths, are being proposed to operate in a band not more than 1 GHz. If a WLAN system operates in a band of 1 GHz or less, service coverage by an access point (AP) may be expanded further as compared with the existing systems, and thus, one AP may be rendered to manage more stations (STAs).

If, in a WLAN system where a large number of STAs co-exist, STAs conduct contention so as to obtain channel access authority, a collision may be highly likely to occur. Because this may render STAs to access the channel, the overall throughput of the WLAN system may be lowered. Accordingly, there is a need for a method that enables efficient access to a channel for frame transmission and reception in a WLAN system where a great number of STAs co-exist.

SUMMARY OF THE INVENTION

An object of the present invention is to provide a method of transmitting and receiving a frame in a WLAN system and an apparatus supporting the same.

In an aspect, a method of transmitting and receiving a frame by an access point (AP) in a wireless communication system is provided. The method comprises transmitting a PST (Parallel Subband Transmission) message indicating transmission of a frame to at least one station (STA) and receiving frames from a first STA and a second STA. The PST message contains first subband information indicating a first subband where a first frame is transmitted from the first STA and second subband information indicating a second subband where a second frame is transmitted from the second STA.

The first frame and the second frame may be transmitted within a PST time (PSTT) period.

The PST message may further contain first PSTT period information indicating the PSTT period to the first STA and second PSTT period information indicating the PSTT period to the second STA.

The first PSTT period information includes PSTT offset information and PSTT duration information, the PSTT offset information indicating an interval between times when the PSTT period is initiated since the PST message is transmitted, and the PSTT duration information indicating duration of the PSTT period.

The PST message further includes first STA identification information indicating the first STA and second STA identification information indicating the second STA.

The first STA identification information indicates an association ID (AID) assigned when the first STA is associated with the AP.

The first STA identification information indicates an MAC (Medium Access Control) address of the first STA.

The method may further comprise transmitting a CTS (Clear To Send)-to-self frame before transmitting the PST message.

The CTS-to-self frame includes a duration field, the duration field indicating a PST period during which a frame is transmitted in response to the PST message. The PST period includes the PSTT period.

An NAV (Network Allocation Vector) is set during the PST period indicated by the duration field by the at least one STA.

In another aspect, a wireless device operating in a WLAN system is provided. The wireless device comprises a transceiver configured to transmit and receive a frame, and a processor operatively coupled with the transceiver. The processor is configured to transmit a PST (Parallel Subband Transmission) message indicating transmission of a frame to at least one station (STA) and receive frames from a first STA and a second STA. The PST message contains first subband information indicating a first subband where a first frame is transmitted from the first STA, and second subband information indicating a second subband where a second frame is transmitted from the second STA.

In still another aspect, a method of transmitting and receiving a frame by a station (STA) in a WLAN system is provided. The method comprises receiving a PST (Parallel Subband Transmission) message from an access point (AP), determining whether to transmit a frame based on the PST message, and transmitting a frame to the AP. The PST message contains STA identification information, subband information indicating a subband for frame transmission, and PSTT (PST Time) period information on a PSTT period during which a frame is transmitted. The frame is transmitted through the subband during the PSTT period.

Determining whether to transmit the frame based on the PST message includes determining to transmit the frame when the STA identification information of the PST message indicates the STA.

The PSTT period information includes PSTT offset information and PSTT duration information, the PSTT offset information indicating an interval between times when the PSTT period is initiated since the PST message is transmitted, and the PSTT duration information indicating duration of the PSTT period.

The method further comprises entering into a sleep mode when receiving the PST message, entering into an awake mode at the time of initiation of the PSTT period that is indicated by the PSTT offset information, and entering into the sleep mode when duration of the PSTT period indicated by the PSTT duration information expires.

Frames are received from a plurality of stations (STAs) via a plurality of sub-bands during a PSTT (Parallel Subband Transmission) period signaled by an access point (AP). Accordingly, the overall throughput of a WLAN system may be increased.

An STA enters into a sleep mode except when the STA is within the signaled PSTT period and enters awake mode only in the PSTT period to transmit frames. By doing so, the STA may be prevented from unnecessary power consumption, thus enhancing efficiency of power saving mode.

DESCRIPTION OF EXEMPLARY EMBODIMENTS

Figure 1:
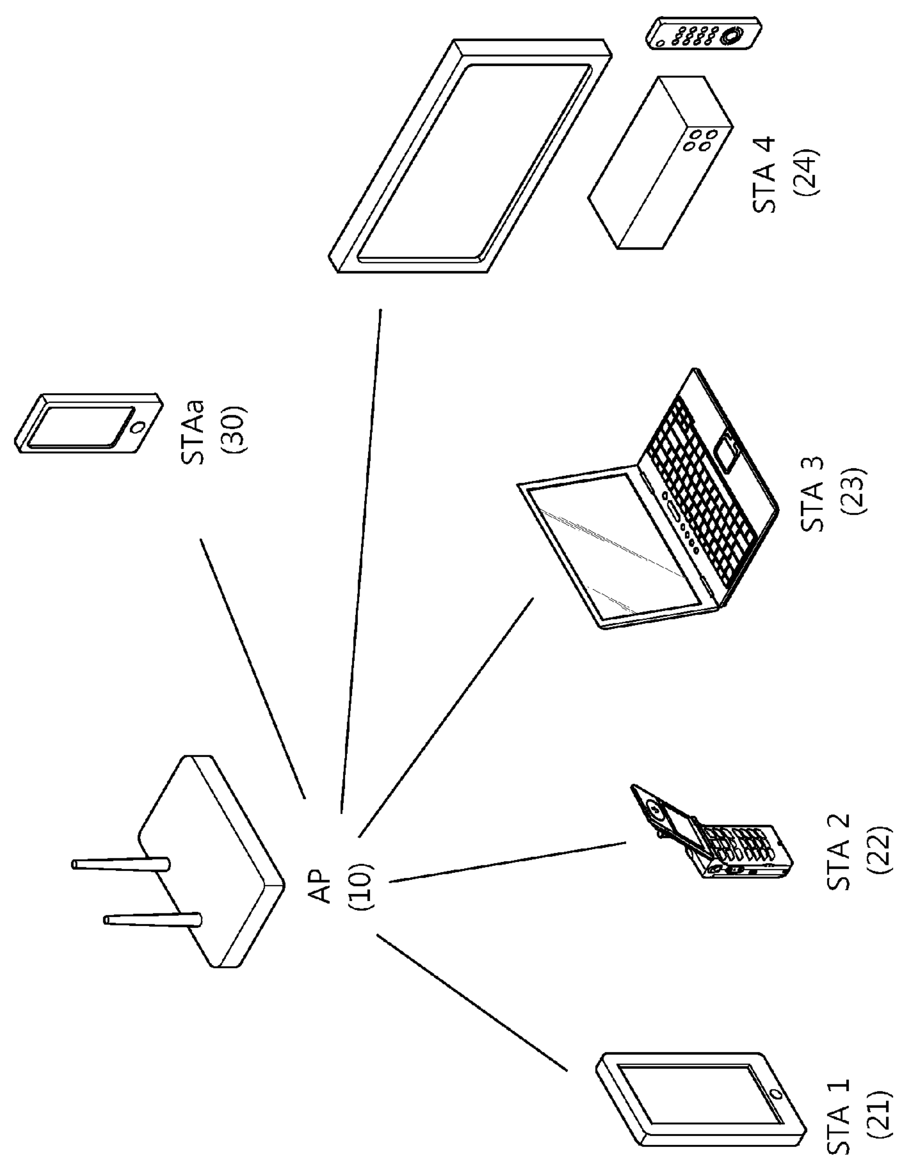
FIG. 1 is a view illustrating the configuration of a typical wireless local area network (WLAN) system to which an embodiment of the present invention may apply.

FIG. 1 is a view illustrating a typical WLAN system to which an embodiment of the present invention may apply.

Referring to FIG. 1, the WLAN system includes one or more basic service sets (BSSs). A BSS refers to a set of stations (STAs) that may successfully sync with each other to communicate with each other and is not the concept of denoting a specific area.

Infrastructure BSSs include one or more non-AP stations (non-AP STA1(21), non-AP STA2(22), non-AP STA3(23), non-AP STA4(24), non-AP STAa(30)), an AP (Access Point) 10 providing a distribution service, and a distribution system (DS) connecting multiple Aps to each other.

In contrast, an independent BSS (IBSS) refers to a BSS operating in ad-hoc mode. An IBSS does not include an AP and thus lacks a centralized management entity. In other words, in the IBSS, non-AP STAs are managed in a distributed manner. In the IBSS, all STAs may consist of mobile STAs and are not permitted to access DS. Thus, the IBSS establishes a self-contained network.

An STA is an arbitrary functional medium containing a medium access control (MAC) following IEEE (Institute of Electrical and Electronics Engineers) 802.11 standards and a physical layer interface relative to a radio medium and may be in broader concept an AP or a non-AP STA.

A non-AP STA is an STA that is not an AP. The non-AP STA may also be referred to as a mobile terminal, wireless device, wireless transmit/receive unit (WTRU), user equipment (UE), mobile station (MS), mobile subscriber unit or simply as a user. Hereinafter, for ease of description, the non-AP STA is denoted an STA.

An AP is a functional entity that offers access to the DS via a radio medium for an STA associated with the AP. In the infrastructure BSS containing the AP, communication between STAs is typically achieved by way of an AP, but in case a direct link is established, direct communication may be possible even between STAs. The AP may also be referred to as a central controller, base station (BS), node-B, BTS (Base Transceiver System), site controller, or managing STA.

A plurality of infrastructure BSSs containing the BSS shown in FIG. 1 may be mutually connected via a distribution system (DS). The plurality of BSSs connected with each other via a DS are denoted an extended service set (ESS). The APs and/or STAs contained in the ESS may communicate with each other, and in the same ESS, an STA may move from one BSS to another while in seamless communication.

In an IEEE 802.11-based WLAN system, the basic access mechanism of MAC (Medium Access Control) is a CSMA/CA (Carrier Sense Multiple Access with Collision Avoidance) mechanism. The CSMA/CA mechanism is also called IEEE 802.11 MAC distributed coordination function (DCF). Basically, the CSMA/CA mechanism adopts "listen before talk" access mechanism. According to such types of access mechanisms, an AP and/or STA, before starting transmission, senses a radio channel or medium. As a result of the sensing, if the medium is determined to be in idle status, frame transmission is initiated through the medium. Contrary to this, if the medium is determined to be in occupied status, the AP and/or STA sets up a delay period for medium access and waits rather than starting its own transmission.

The CSMA/CA mechanism contains virtual carrier sensing as well as physical carrier sensing by which an AP and/or STA directly senses medium. The virtual carrier sensing is to compensate for an issue that may be caused upon medium access, such as hidden node problem. For virtual carrier sensing, the MAC in a WLAN system utilizes network allocation vector (NAV). A NAV is a value by which an AP and/or STA that is currently using the medium or has authority to use it indicates to other AP and/or STA a time remaining until the medium is rendered to be available. Accordingly, a value set by a NAV corresponds to a time scheduled for use of medium by an AP and/or STA transmitting a frame.

The IEEE 802.11 MAC protocol offers a PCF (Point Coordination Function)-based HCF (Hybrid Coordination Function) that conducts periodic polling so that all receiving APs and/or STAs to receive data packets in a polling-based synchronous access scheme with the DCF. The HCF has contention-based EDCA (Enhanced Distributed Channel Access) that adopts a contention-based access scheme when a provider offers data packets to multiple users and HCCA (HCF Controlled Channel Access) that uses a contention-free-based channel access scheme using a polling mechanism. The HCF includes a medium access mechanism for enhancing QoS (Quality of Service) of WLAN and may send QoS data during either a contention period (CP) or a contention-free period (CFP).

A wireless communication system cannot be aware of presence of a network immediately when a STA powers on to start operation in view of characteristics of radio media. Accordingly, an STA, whatever type it is, should conduct a network discovery process so as to access a network. Upon discovering a network through the network discovery process, the STA selects a network to which the STA is to subscribe via a network selecting process. Thereafter, the STA subscribes to the selected network and conducts data exchanging operation at the transmit/receive end.

In a WLAN system, the network discovery process is implemented as a scanning procedure. The scanning procedure includes passive scanning and active scanning. Passive scanning is achieved based on a beacon frame that is periodically broadcast by an AP. Typically, an AP in a WLAN broadcasts a beacon frame at each specific interval (for example, 100 msec). The beacon frame contains information on a BSS managed by the AP. The STA waits to manually receive a beacon frame at a specific channel. When obtaining information on the network by receiving the beacon frame, the STA terminates the scanning procedure at the specific channel. Since passive scanning is achieved once the STA receives the beacon frame without the need of the STA receiving a separate frame, it provides an advantage that the overall overhead is reduced. However, it suffers from the fact that the time of performing scanning is increased in proportion to the transmission period of the beacon frame.

In active scanning, the STA actively broadcasts a probe request frame at a specific channel so as to request that all the APs receiving the probe request frame send network information. When receiving the probe request frame, an AP waits a random time to prevent frame collision and then includes network information in a probe response frame, then sending the probe response frame to the STA. The STA receives the probe response frame to obtain the network information and terminates the scanning procedure. Active scanning is advantageous in that scanning can be finished within a relatively short time. In contrast, active scanning requires a frame sequence according to request-response, thus causing an increase in the overall network overhead.

When finishing the scanning procedure, the STA selects a network according to its specific standard and then conducts an authentication procedure with the AP. The authentication procedure is done in a 2-way handshake manner. Upon finishing the authentication procedure, the STA proceeds with an association procedure with the AP.

The authentication procedure is performed in a two-way handshake manner. First, the STA sends an association request frame to the AP. The association request frame contains information on capabilities of the STA. Based on the information, the AP determines whether to permit the STA to do association. When determining whether to permit association, the AP sends an association response frame to the STA. The association response frame contains information indicating whether to permit association and information indicating why association is permitted or fails. The association response frame further contains information on capabilities that may be supported by the AP. In case association is successfully done, frames may be normally exchanged between the AP and the STA. In case association fails, the association procedure is re-attempted based on the information on why the association has failed, which contained in the association response frame, or the STA may request other AP to do association.

IEEE 802.11n has been relatively recently established to overcome the limit on communication speed that has been considered as a weakness. IEEE 802.11n aims to increase network reliability and speed and expand to operation distance of a radio network. More specifically, IEEE 802.11n supports high throughput (HT) with a data processing speed up to 540 MHz and is based on MIMO (Multiple Inputs and Multiple Outputs) using multiple antennas at both the transmitting unit and the receiving unit so as to optimize data speed as well as to minimize transmission errors.

As WLAN spreads or various WLAN-related applications are diversified, a need comes up for a new WLAN system that may be supportive of a higher throughput than the data processing speed supported by IEEE 802.11n. A VHT (Very High Throughput)-supportive WLAN system is a next-generation version of IEEE 802.11n WLAN system and is among IEEE 802.11 WLAN systems that are nowadays on proposal for supporting a throughput of 500 Mbps or higher for a single user and a data processing speed of 1 Gbps or higher for multiple users at an MAC service access point (SAP).

Further to existing WLAN systems supportive of 20 MHz or 40 MHz, the VHT WLAN system intends to support 80 MHz, contiguous 160 MHz, non-contiguous 160 MHz bandwidth transmission and/or higher bandwidth transmission. In addition, the VHT WLAN system supports QAM as compared with the existing WLAN system supportive of up to 64QAM (Quadrature Amplitude Modulation).

Since the VHT WLAN system supports MU-MIMO (Multi User-Multiple Input Multiple Output) transmission scheme for higher throughput, an AP may send data frames to at least one or more STAs that are MIMO-paired with the AP. The number of paired STAs may be maximally 4, and when the number of largest spatial streams 8, each STA may be assigned up to four spatial streams.

Turning back to FIG. 1, in the WLAN system shown in the figure, the AP 10 may simultaneously send data to an STA group including at least one or more STAs among the plurality of STAs 21, 22, 23, 24, and 30 associated with the AP 10. Although in FIG. 1 the AP conducts MU-MIMO transmission to the STAs, a data transmitting STA may send PPDUs to the plurality of STAs using an MU-MIMO transmission scheme in a mesh network-supportive WLAN system. Hereinafter, an example is described in which the AP transmits PPDUs to the plurality of STAs according to an MU-MIMO transmission scheme.

Data may be transmitted to the STAs via different spatial streams. A data packet transmitted from the AP 10 may be referenced as a PPDU that is generated at the physical layer and transmitted or as a frame, as a data field contained in the PPDU. In other words, a PPDU for SU (Single User)-MIMO and/or MU-MIMO or a data field contained in the PPDU may be an MIMO packet. Among these, a PPDU for MU may be referred to as an MU packet. In an embodiment of the present invention, assume that a transmission target STA group MU-MIMO paired with the AP 10 includes STA1 21, STA2 22, STA3 23, and STA4 24. In this case, a specific STA in the transmission target STA group is assigned with no spatial stream, so that no data may be transmitted to the STA. Meanwhile, assume that STAa 30 is associated with the AP but is not contained in the transmission target STA group.

In order to support MU-MIMO transmission in a WLAN system, an identifier may be assigned to a transmission target STA group, and this identifier is denoted a group ID.

The AP sends to the STAs a group ID management frame containing group definition information for group ID assignment, and accordingly, the group ID is assigned to the STAs prior to PPDU transmission. One STA may be assigned multiple group IDs.

Table 1 below represents information elements contained in the group ID management frame.

TABLE 1

| Order | Information |
|---|---|
| 1 | Category |
| 2 | VHT action |
| 3 | Membership status |
| 4 | Spatial stream position |

The category field and the VHT action field are configured so that the frame is a management frame and may identify that the frame is a group ID management frame used in a MU-MIMO supportive next-generation WLAN system.

As shown in Table 1, the group definition information contains membership state information indicating whether it belongs to a specific group ID, and if so, spatial stream location information on the position of the spatial stream set of the STA in the entire spatial streams according to MU-MIMO transmission.

Since one AP manages a plurality of group IDs, the membership state information provided to one STA needs to indicate whether the STA belongs to each group ID managed by the AP. Accordingly, the membership state information may be provided in the form of an array of subfields indicating whether it belongs to each group ID. The spatial stream location information indicates the location for each group ID, and thus, may be present in an array of subfields indicating the location of the spatial stream set occupied by the STA for each group ID. Further, the membership state information and the spatial stream location information for one group ID may be implemented in one subfield.

In case the AP sends PPDUs to a plurality of STAs by an MU-MIMO transmission scheme, information indicating a group ID may be contained as control information in the PPDU. If the STA receives a PPDU, the STA identifies the group ID field to verify whether it is a member STA in the transmission target STA group. If the STA is verified to be a member in the transmission target STA group, what number of location in the entire spatial streams the spatial stream set transmitted to the STA is may be confirmed. Since the PPDU contains information on the number of spatial streams assigned to the receiving STA, the STA may discover the spatial streams assigned thereto and receive data.

Meanwhile, the TV WS (White Space) draws attention as a frequency band that may be newly available in a WLAN system. The TV WS is a dormant-state frequency band that remains as the analogue TV is digitalized in the U.S. For example, the TV WS refers to a band of 54 MHz to 698 MHz. However, this is merely an example, and the TV WS may be a licensed band that may be first used by a licensed user. The licensed user refers to a user licensed to use a licensed band and may also be denoted a licensed device, primary user, or incumbent user.

An AP and/or STA operating in the TV WS should offer protection of licensed users because licensed users have priority in using the TV WS band. For example, in case a specific WS channel that is a frequency band split per protocol to have a predetermined bandwidth in the TV WS band is already being used by a licensed user such as a microphone, the AP and/or STA cannot use the frequency band corresponding to the WS channel to protect the licensed user. Further, the AP and/or STA should stop use of the frequency band when the frequency band being used for transmission and/or reception of a current frame is put to use by the licensed user.

Accordingly, the AP and/or STA should first conduct a procedure of grasping whether a specific frequency band in the TV WS band may be used, i.e., whether there is a licensed user in the frequency band. Grasping whether a licensed user is in a specific frequency band is referred to as spectrum sensing. As spectrum sensing mechanisms, energy detection or signal detection is utilized. If the strength of a received signal is a predetermined value or higher or if a DTV preamble is detected, it may be determined that a licensed user is using the band.

Figure 2:
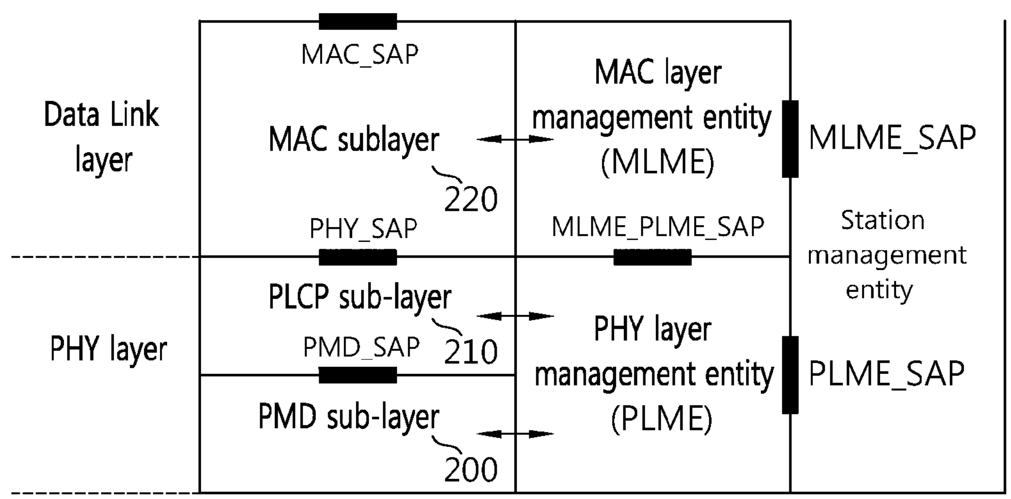
FIG. 2 is a view illustrating a physical layer architecture of an IEEE 802.11-supportive WLAN system.

FIG. 2 is a view illustrating a physical layer architecture of a WLAN system supported by IEEE 802.11.

The IEEE 802.11 physical layer (PHY) architecture consists of a PLME (PHY layer Management Entity), a PLCP (Physical Layer Convergence Procedure) sublayer 210, and a PMD (Physical Medium Dependent) sublayer 200. The PLME provides a function of managing a physical layer in cooperation with the MLME (MAC Layer Management Entity). The PLCP sublayer 210 transfers an MPDU (MAC Protocol Data Unit) received per instruction from the MAC layer to the PMD sublayer between the MAC sublayer 220 and the PMD sublayer 200 or delivers frames coming from the PMD sublayer 200 to the MAC sublayer 220. The PMD sublayer 200 is a PLCP sublayer and enables transmission and reception of physical layer entities between two stations via a radio medium. The MPDU transferred by the MAC sublayer 220 is denoted PSDU (Physical Service Data Unit) in the PLCP sublayer 210. The MPDU is similar to the PSDU but may differ from the PSDU in case an A-MPDU (aggregated MPDU) obtained by aggregating multiple MPDUs has been delivered.

The PLCP sublayer 210 adds additional fields containing necessary information by a physical layer transceiver while receiving the PSDU from the MAC sublayer 220 and transferring to the PMD sublayer 200. The added fields include a PLCP preamble to the PSDU, a PLCP header, and tail bits necessary to turn the convolution encoder to zero state. The PLCP sublayer 210 receives from the MAC sublayer a TXVECTOR parameter containing control information necessary for a receiving STA to receive and analyze a PPDU and control information necessary to generate and send a PPDU. The PLCP sublayer 210 uses information contained in the TXVECTOR parameter in generating a PPDU containing a PSDU.

The PLCP preamble serves to enable a receiver to prepare for antenna diversity and sync function prior to transmission of a PSDU. Data fields may include padding bits to the PSDU, a service field containing a bit sequence for initializing scrambler, and a coded sequence obtained by encoding a bit sequence added with tail bits. At this time, depending on encoding schemes supported by an STA receiving PPDU, BCC (Binary Convolutional Coding) encoding or LDPC (Low Density Parity Check) encoding may be selected. The PLCP header contains a field with information on PPDU (PLCP Protocol Data Unit) to be sent.

The PLCP sublayer 210 adds the above-described fields to the PSDU, generating a PPDU (PLCP Protocol Data Unit). The PLCP sublayer 210 transmits it to a receiving station via a PMD sublayer, and the receiving station receives the PPDU to obtain information necessary for restoring data from the PLCP preamble and PLCP header, thus restoring the data. The PLCP sublayer of the receiving station delivers the RXVECTOR parameter containing control information included in the PLCP preamble and PLCP header to the MAC sublayer to analyze the PPDU in receive state and obtain data.

Meanwhile, as various communication services such as smart grid, e-Health, or ubiquitous services, appear, M2M (Machine to Machine) technology for supporting the services gain popularity. A sensor sensing temperature or moisture, a camera, a home appliance such as TV, a processing machine in the factory, or large-size machines such as vehicles may be elements constituting an M2M system. M2M system configuring elements may perform data transmission and reception based on WLAN communication. In case devices constituting an M2M system are supportive of WLAN and configure a network, such will be hereinafter referred to as an M2M WLAN system.

An M2M-supportive WLAN system has the following features:

1) Many STAs: M2M assumes, in contrast to existing networks, that a large number of STAs are present in a BSS because sensors in the home or business, as well as individuals' devices are taken into account. Accordingly, a great number of STAs may be linked to a single AP.

2) Low traffic load per STA: Since an M2M terminal has a traffic pattern of collecting and reporting ambient information, information need not be sent often and the amount of information is relatively small.

3) Uplink-centered communication: M2M primarily has the structure of receiving commands on downlink, taking actions, and as a result, reporting data on uplink. Major data is typically transmitted on user plane, so that an M2M-supportive system is uplink centered.

4) STA's power management: An M2M terminal is primarily battery-powered and in many cases is difficult for a user to recharge. Accordingly, a power management scheme is required to minimize battery consumption.

5) Automatic restoring function: A device constituting an M2M system is hard for a human to directly manipulate under a specific circumstance, and thus, a self-restoring function is required.

A next-generation WLAN system standard in which such M2M communication is an applicable example is now on discussion. Noticeable characteristics of such WLAN system include service coverage with a radius of 1 km or more in an unlicensed band not more than 1 GHz band except the TV WS band, and this means that it provides considerably broad service coverage as compared with the existing indoor-centered WLAN. In other words, contrary to 2.4 GHz and 5 GHz as conventional, in case WLAN is operated in a band of 1 GHz or less, which is represented as 700 to 900 MHz, the AP's service coverage may be expanded roughly two or three times more relative to the same transmit power due to propagation features of the band. In such case, a great number of STAs may be linked to one AP. The next-generation WLAN considers the following applications.

Use example 1. Sensors and meters

1a: smart grid-meter to pole

1c: environmental/agricultural monitoring

1d: industrial process sensors

1e: healthcare

1f: healthcare

1g: home/building automation

1h: home sensors

Use example 2. Backhaul sensors and meta data

Backhaul aggregation of sensors

Backhaul aggregation of industrial sensors

Use example 3. Extended range Wi-Fi

Outdoor extended range hotspot

Outdoor Wi-Fi for cellular traffic offloading

Use example 1 above, sensors and meters, is an example in which the above-described M2M is used. In usage 1, various types of sensor devices may be connected to an AP in a wireless LAN system to perform communication. Particularly in the case of smart grid, up to 6000 sensor devices may gain access to a single AP.

In use example 2, backhaul sensors and data meters, an AP providing broad coverage serves as a backhaul link of another communication system.

Use example 3 aims to provide an outdoor extended range of hotspot communications such as extended home service coverage, campus service coverage, or shopping mall service coverage or aims to allow the AP to distribute overloaded cellular traffic by offloading traffic for cellular mobile communication.

An M2M-supportive WLAN system cuts off the functions of the existing STA and needs to expand managing functions of the AP that directly accesses the network. In an M2M WLAN system, the STA is typically a low-cost machine, and thus, might not be operated by a user. Thus, since the STA's operation may be limited, communication protocols performed by the STA need to be reduced.

Figure 3:
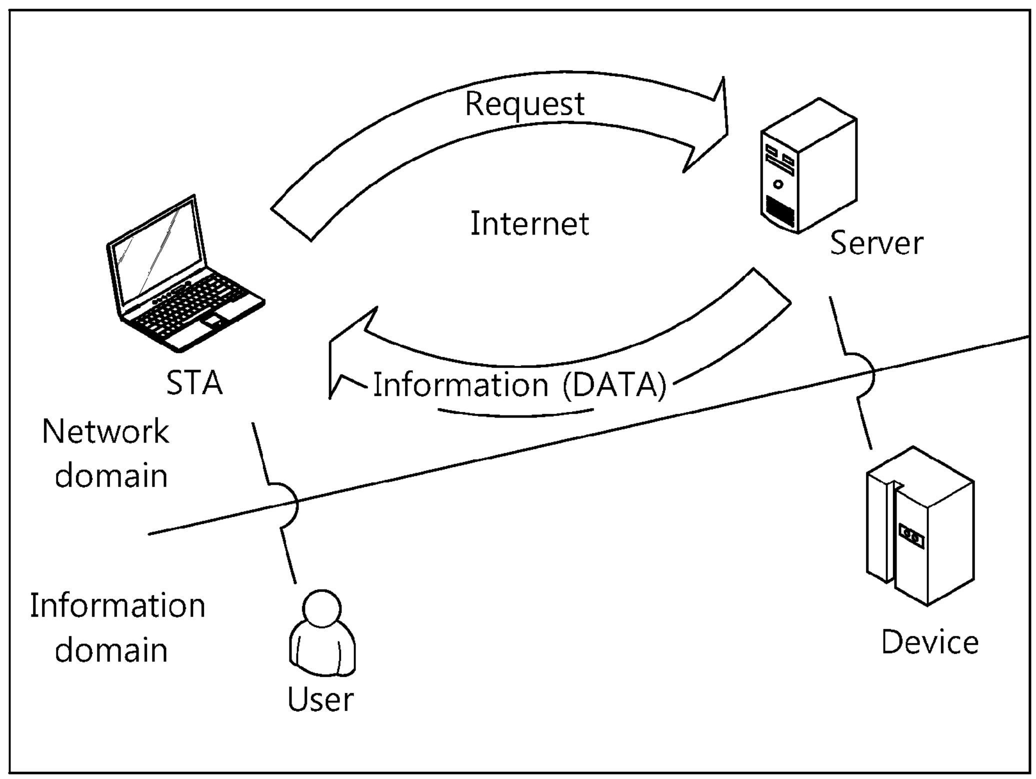
FIG. 3 is a view illustrating an existing network model.

FIG. 3 is a view illustrating an existing network model. The network model may be split into network domain and information domain for further consideration.

The network domain refers to physical elements constituting an actual network and their relationship. Although there are various network structures, a most typical server/client structure has been represented. In many cases, a client (or STA) sends a request for interface to a server, and the server sends corresponding information (DATA) to the STA. The above communication flow is the reason why communication techniques have been developed downlink-centered.

The information domain represents parties that actually provide and receive information in view of information and their relationship. That is, a client (or STA) receives information in the network domain, but a user using the STA receives information in the information domain. Likewise, a server may be deemed a machine that has mechanically collected information in the information domain.

However, changes are made to the above network structure in M2M.

Figure 4:
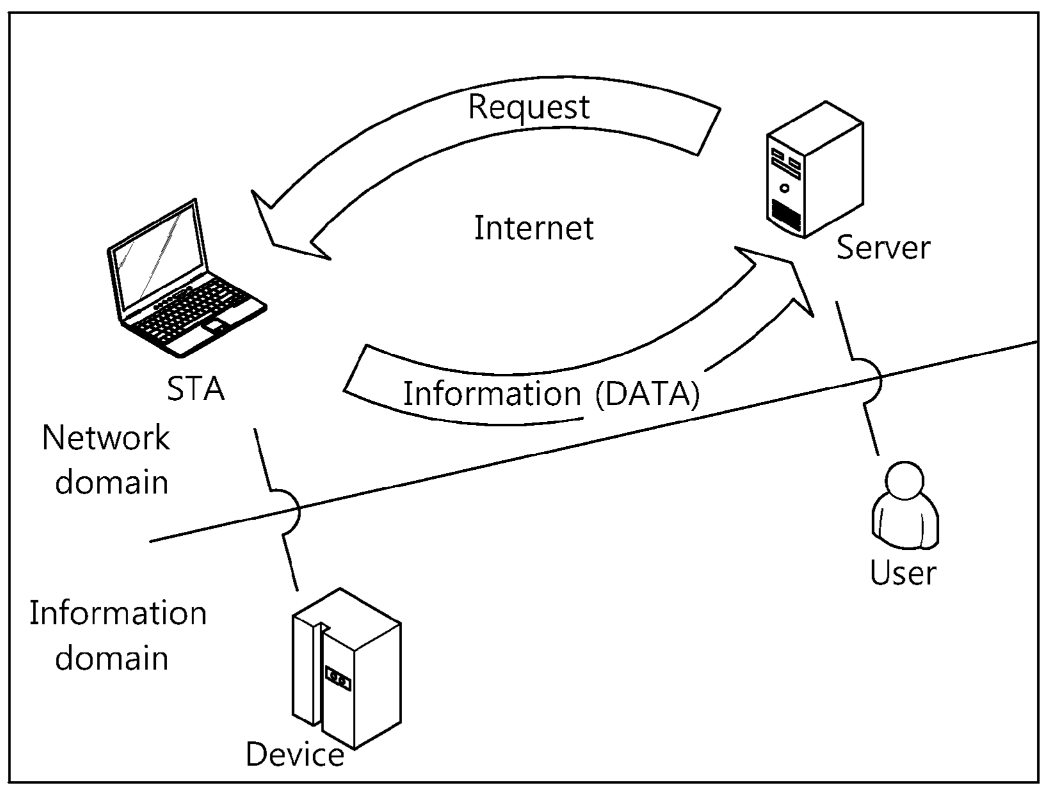
FIG. 4 is a view illustrating an M2M-supportive network model.

FIG. 4 is a view illustrating an M2M-supportive network model.

Unlike the example described above in connection with FIG. 3, the STA serves to provide information and the server requests information. The M2M server sends a measurement instruction message to the STA based on a specific condition, and the STA performs measurement according to the instruction and sends a result to the M2M server. This is a typical model. In the information domain, the server requesting information corresponds to a user, and the STA providing information corresponds to a machine. That is, unlike existing network models, the server accesses the network, and the communication flow is opposite.

In light of the forgoing, techniques related to network management needs to be re-considered in an M2M-supportive network. In the previous network model, a user is positioned at the side of STA, and thus, the STA is also given a network managing function. In contrast, in an M2M-supportive network, the STA suffices providing information in response to an instruction/command, and thus, the server's network management function needs to be reinforced further than before.

Meanwhile, even a case where several thousands of STAs are linked to an AP may also be considered in an M2M-supportive WLAN system, from the point of view of system implementation. In such case, the existing scheme in which one STA accesses a channel once at a time to perform communication based on CSMA/CA schemes may be limited in light of efficient network management. That is, since in an M2M-supportive WLAN system, the WLAN system is operated in a band of 1 GHz or less, whose representative band is 700 MHz to 90 MHz, unlike 2.4 GHz or 5 GHz, the AP's service coverage may be expanded approximately two or three times more relative to the same transmit power due to frequency characteristics of the band. Accordingly, a very large number of STAs may be linked to one AP.

A scheduling mechanism may be introduced for supporting efficient frame transmission and reception in the next-generation WLAN system in which a great number of STAs are cooperatively linked to the AP. The number of STAs operating in the BSS reaches a few thousands, and if contention is performed in a CSMA/CA manner for occupying radio medium, a collision may be highly likely to occur. This may cause a reduction in the overall throughput of WLAN system.

To address such problems, a parallel subband transmission (PST) scheme is proposed. In case frame transmission and reception are possible through a channel constituted of one or more subbands in the BSS, AP-STA transmission and reception may be performed in parallel per subband, and such transmission scheme is referred to as PST. Hereinafter, a PST-based frame transmission and reception method is described in detail.

Figure 5:
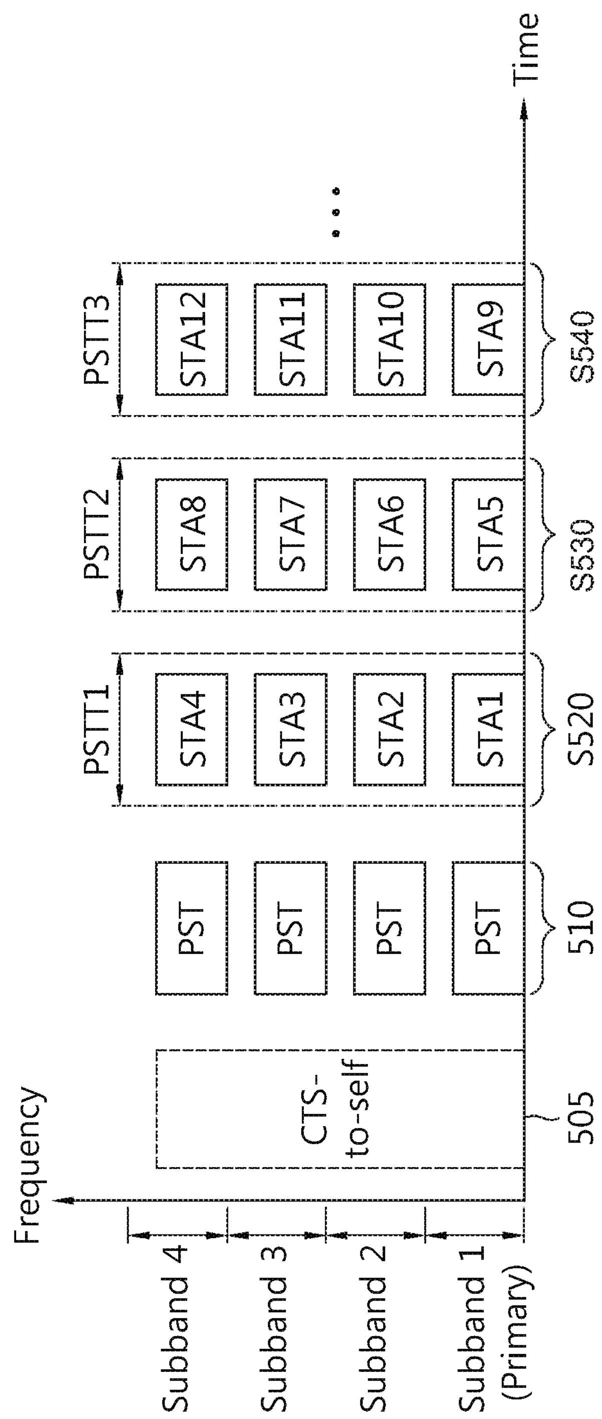
FIG. 5 is a view illustrating an example PST-based frame transmission and reception method according to an embodiment of the present invention.

FIG. 5 is a view illustrating an example method of transmitting and receiving a frame based on PST according to an embodiment of the present invention.

In the example shown in FIG. 5, there is described a transmission and reception method in the BSS operating at an operation channel bandwidth obtained by tying up four contiguous subchannels. However, the present invention is not limited by the number of subbands or whether contiguity in the subband of operation channel bandwidth is established. Further, in the instant example, the STA's use of subchannels are arranged in order, but according to implementations, such arrangement may be shown in various types.

In order to perform PST-based frame transmission and reception, an AP is assumed to be aware of the STA that accesses channel for frame transmission.

Referring to FIG. 5, the AP informs that PST is initiated by broadcasting a PST message (S510). The PST message contains time (PST time; PSTT)-related information relating to the time each STA may access channel and information on a subband permitted for each STA to access during the PSTT.

Each STA may send frames to the AP via a subband designated during the predetermined PSTT by receiving the PST message (S520, S530, and S540). For example, STA1 may receive a PST message and may be aware that it may send frames through subband 1 during the PSTT1 period via the PSTT time information and subband information contained in the PST message. Accordingly, STA1 may send frames to the AP via subband 1 during PSTT1. As such, STA1 to STA4 transmit frames to the AP via subband 1, 2, 3, or 4 during the PSTT1 period (S520). STA5 to STA8 send frames to the AP through subbands 1, 2, 3, or 4 during PSTT2 (S530). STA9 to STA12 send frames to the AP through subbands 1, 2, 3, or 4 during the PSTT3 period (S540).

As above, when receiving the PSTT message from the AP, the STA may send frames with no collision even without conducting contention with other STA for channel access. The STA does not need CCA (Clear Channel Assessment) nor need it receive an acknowledgement (ACK) frame responsive to the transmitted frame.

Meanwhile, the AP may previously take up the entire channels prior to sending the PST message in order to protect the period during which frame transmission and reception is performed based on PST from other interfering signals such as BSS. For this purpose, the AP may send a CTS-to-self frame (S505). The CTS-to-self frame is a CTS frame with an RA (Receiver Address) field set as the AP's MAC address, and when receiving the CTS-to-self frame transmitted from the AP, other AP and/or STA may configure and operate an NAV (Network Allocation Vector) during the time period indicated by the duration field of the CTS-to-self frame. Accordingly, the AP may protect the overall PST period by sending the CTS-to-self frame containing the duration field set as the time enough to cover the entire PSTT during which PST-based frame transmission and reception is conducted. The above-described CTS-to-self frame may be sent through the entire channels for PST-based frame transmission and reception. Further, a CTS-to-self frame of a replicated format may also be transmitted which is transmitted through the entire channels and in which each CTS-to-self frame is transmitted per subband.

Because frame transmission and reception is done depending on the information previously signaled through the PST message during the PST period, each STA may operate in sleep mode without sensing or hearing channel except the PSTT assigned thereto. Each STA may enter into awake mode at the time the PSTT for the STA is initiated and may then send frames. By doing so, unnecessary power consumption by each STA may be prevented, enhancing efficiency of power saving mode operation.

Further, since frames may be simultaneously transmitted and received in parallel as many as the number of available subbands, although multiple STAs send frames, channel access may be efficiently done to thus perform channel transmission and reception. Accordingly, the overall throughput of WLAN may be enhanced.

The above-described PST message may be implemented as a PST frame separately defined or a beacon frame containing a PST information element.

Figure 6:
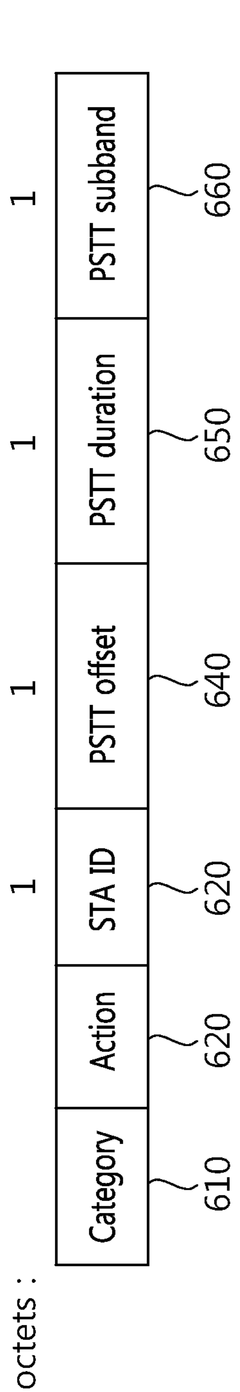
FIG. 6 is a block diagram illustrating the format of a PST frame according to an embodiment of the present invention.

FIG. 6 is a block diagram illustrating a PST frame format according to an embodiment of the present invention.

Referring to FIG. 6, the PST frame 600 includes a category field 610, an action field 620, an STA ID field 630, a PSTT offset field 640, a PSTT duration field 650, and a PSTT subband field 660.

The category field 610 and the action field 620 may be configured to indicate that the frame is a PST action frame.

The STA ID field 630 contains information for identifying STA to which the PSTT related information according to the subsequent PSTT offset field 640 and PSTT duration field 650 and PSTT subband field 660 subband related information are applied. As an example, the STA ID field 630 may be configured as the STA's AID (including partial AID) and MAC address.

The PSTT offset field 640 and the PSTT duration field 650 implement PSTT related information specifying the PSTT assigned to the STA indicated by the STA ID field 630. The PSTT offset field 640 is configured to indicate the time the STA's PSTT is initiated. The PSTT offset field 640 is configured as a certain offset value that may apply based on the time the PST frame 600 has been transmitted. The PSTT duration field 650 may be configured to indicate the length of the PSTT indicated by the PSTT offset field 640.

The PSTT duration field 650 may be configured to indicate the subband accessed by the STA indicated by the STA ID field 630 for frame transmission during the PSTT.

Meanwhile, the afore-described STA ID field 630, PSTT offset field 640, PSTT duration field 650, and PSTT subband field 660 may be repeatedly included according to STAs with a PST scheduled by the AP. Further, in case a PSTT is configured for a certain STA twice or more, the fields for the STA may be repeated in the PST frame 600.

Figure 7:
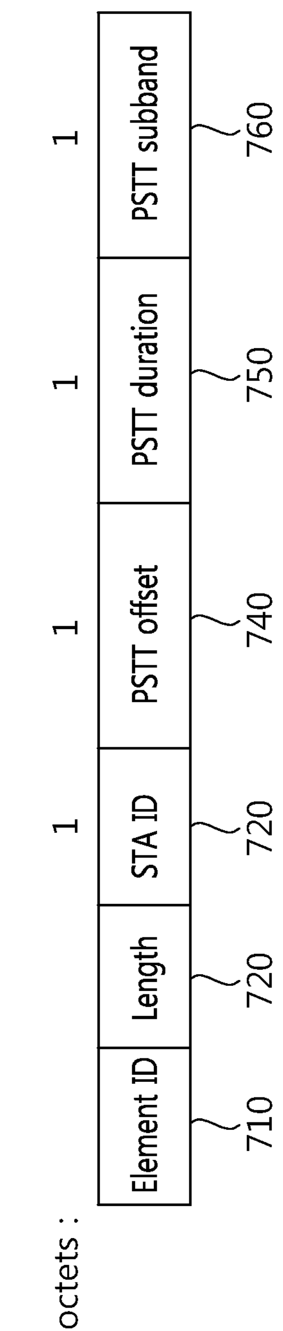
FIG. 7 is a block diagram illustrating the format of a PST information element according to an embodiment of the present invention.

FIG. 7 is a block diagram illustrating a PST information element format according to an embodiment of the present invention.

Referring to FIG. 7, the PST information element 700 includes an element ID field 710, a length field 720, an STA ID field 730, a PSTT offset field 740, a PSTT duration field 750, and a PSTT subband field 760.

The element ID field 710 may be configured to indicate that the information element is a PST information element. The length field 720 may be configured to the total length of the fields included subsequent to the length field 720 in the PST information element 700.

The STA ID field 730, the PSTT offset field 740, the PSTT duration field 750, and the PSTT subband field 760 may be implemented like the above-described STA ID field 630, PSTT offset field 640, PSTT duration field 650, and PSTT subband field 660 in the PST frame 600. However, an offset value indicated by the PSTT offset field 740 may apply based on the time when the beacon frame containing the PST information element 700 has been transmitted.

When receiving the PST message, the STA may determine whether the PSTT information and subband information are for the STA based on the STA ID field 630 or 730. Further, based on the PSTT offset field 640 or 740 and the PSTT duration field 650 or 750, the PSTT period may be verified, and based on the PSTT subband field 660 or 760, a subband to be used during the PSTT period may be verified. By way of such process, the STA may send frames using the subband signaled during the scheduled PSTT period.

Meanwhile, the AP that is aware of information on the STA to send frames may reduce the overall PST period by scheduling the PST period so that frames are transmitted in parallel using as many subbands as possible in the channel bandwidth supported by each STA.

Figure 8:
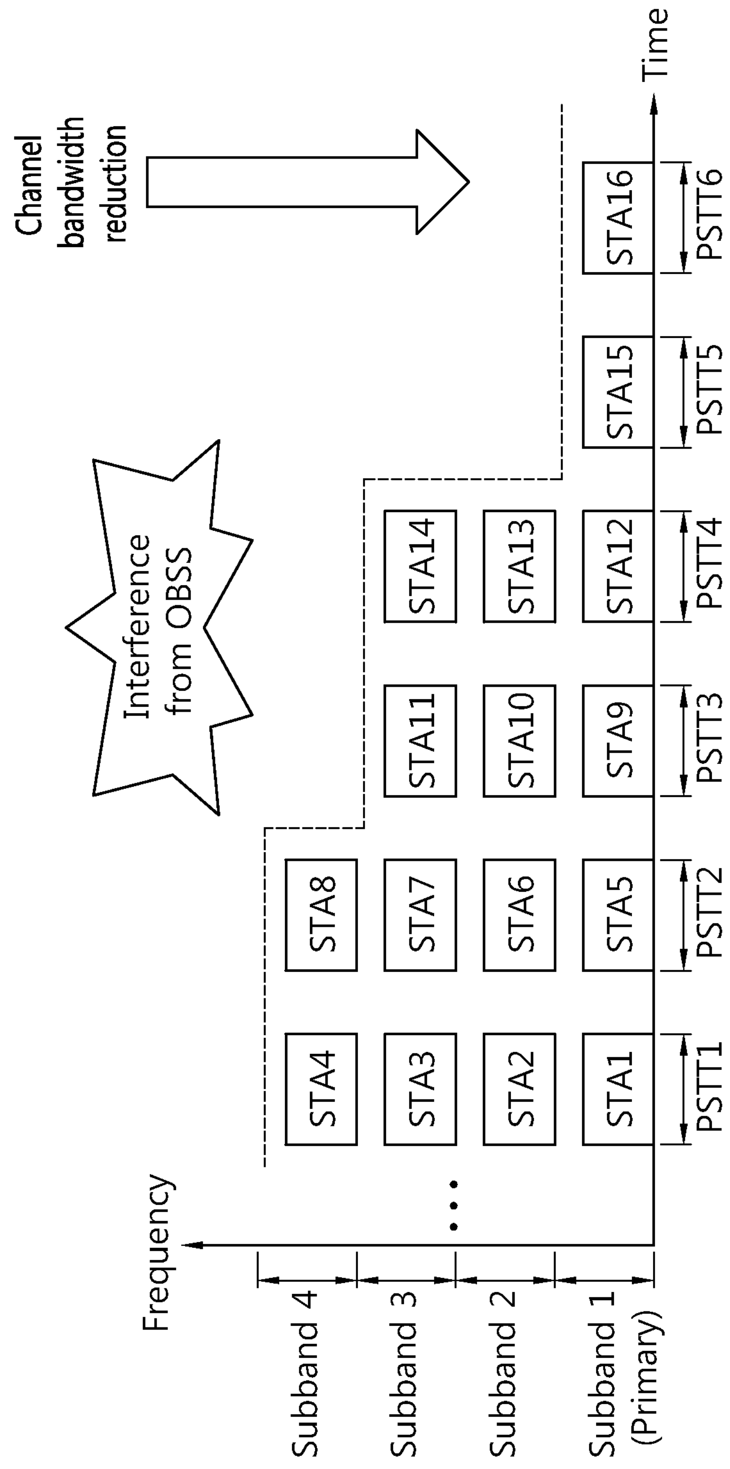
FIG. 8 is a view illustrating another example PST-based frame transmission and reception method according to an embodiment of the present invention.

The overall PST period may be reserved by the AP through the CTS-to-self frame or PST message. Meanwhile, the AP may assign only some subbands to the STA rather than assigning all the subbands to the STA during each PSTT period. In such case, a predetermined number of subbands are not occupied by the STAs during the PSTT period. Accordingly, the STA that failed to receive the CTS-to-self frame or PST message or other BSS's AP and/or STAs may determine that the subband is left in idle mode and that it is a channel accessible for frame transmission. Accordingly, the subbands may be occupied by other AP and/or STA and frames may be transmitted and received via the subbands. Such subband occupancy may interfere with frame transmission and reception that may be carried out during a subsequent PSTT period. Thus, when the AP performs scheduling for PST, subbands subsequently assigned to the STAs may be implemented to be the same as the previously assigned subbands or only some may be assigned. Refer to FIG. 8.

FIG. 8 is a view illustrating another method PST-based frame transmission and reception method according to an embodiment of the present invention. In the example shown in FIG. 8, assume that the AP schedules PST for 16 STAs and PSTT period is set six times in total.

Referring to FIG. 8, scheduling may be made so that frames may be transmitted and received with subbands 1 to 4 assigned to STAs during the PSTT1 period and the PSTT2 period. Thereafter, during the PSTT3 and PSTT4 periods, subbands 1 to 3 are assigned to the STAs upon transmission and reception of frames, conducting scheduling.

Meanwhile, subband 4 may be recognized as idle mode by the AP and/or STA present in other BSS during the PSTT3 and PSTT4 periods or the STA that is present in the same BSS but is not aware of whether the PST is initiated. Accordingly, the AP and/or STAs may begin frame transmission and reception by occupying subband 4. As an example, frame transmission and reception by OBSS (Overlapping BSS) may be conducted through subband 4 and this may serve as interference by the OBSS.

The AP, thereafter, does not assign subband 4 to the STAs during the PSTT period, and thus, occupancy of subband 4 by other AP and/or STAs may affect, as interference, the STAs transmitting and receiving frames based on the PST.

Referring back to FIG. 8, since subband 4 is excluded and only subband 1 is assigned to the STAs during the PSTT5 and PSTT6 periods, frame transmission and reception may be conducted without being interfered by frame transmission and reception of other AP and/or STAs in subband 4.

STAs being able to transmit and receive frames to/from the AP according to a PST-based frame transmission and reception method may support different channel bandwidths. Accordingly, upon scheduling PST, the AP first assigns subband and PSTT period to STAs supporting a broad channel bandwidth and assigns subband and PSTT period to STAs supporting a narrow bandwidth.

Figure 9:
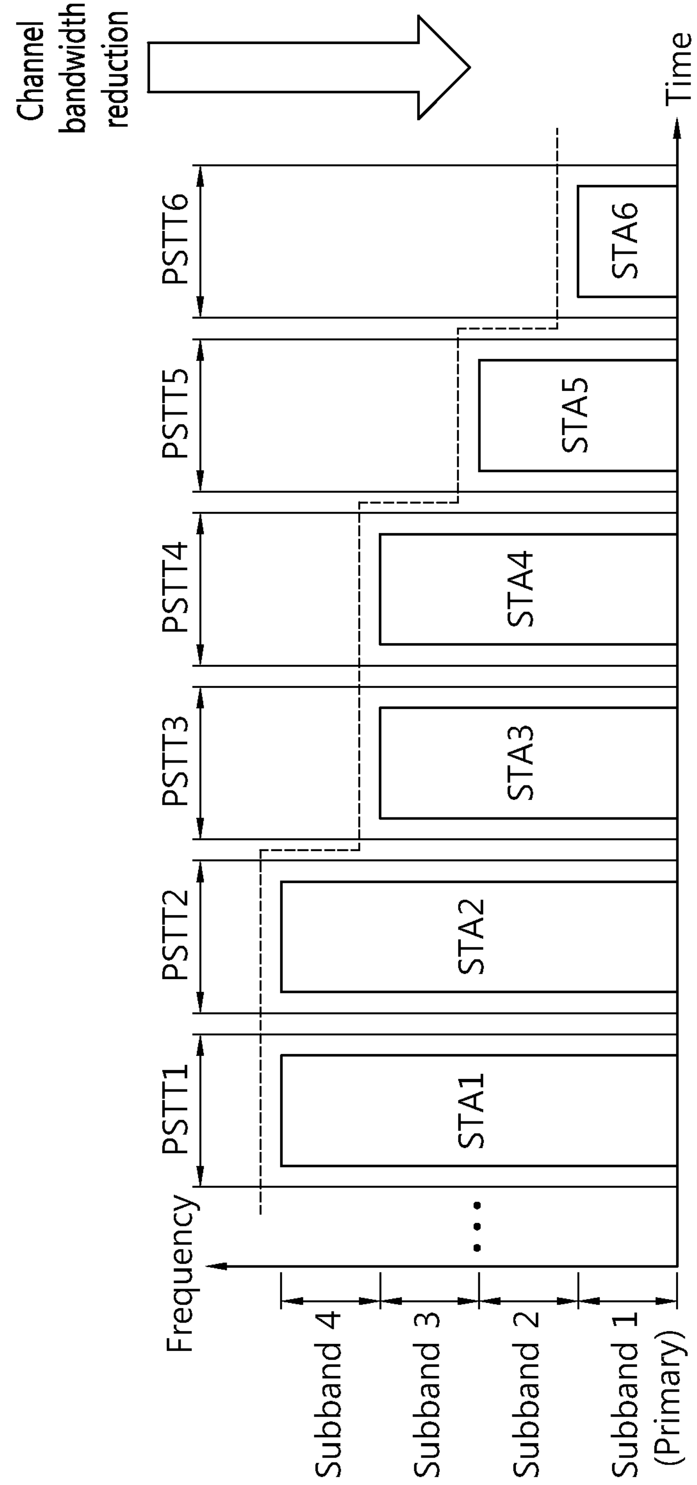
FIG. 9 is a view illustrating another PST-based frame transmission and reception method according to an embodiment of the present invention.

FIG. 9 is a view illustrating another example PST-based frame transmission and reception method according to an embodiment of the present invention.

Referring to FIG. 9, STA1 and STA2 that may support channel bandwidth according to four subbands are assigned subband1 to subband 4, and STA1 is assigned PSTT1 period while STA2 is assigned PSTT2 period.

Since STA3 and STA4 may support channel bandwidth according to three subbands, they are assigned PSTT periods after STA1 and STA2. STA3 and STA4 are assigned subband1 to subband 3, and are assigned PSTT3 period and PSTT4 period, respectively.

Since STA5 is supportive of channel bandwidth according to two subbands, it is assigned a PSTT period after STA3 and STA4. STA5 is assigned subband1 and subband2, and is assigned PSTT5 period.

STA6 may support channel bandwidth according to one subband, and thus, is assigned a PSTT period after STA5. STA6 is assigned subband1, together with a PSTT6 period.

In accordance with the frame transmission and reception method shown in FIG. 9, subband4 may be recognized as idle mode by other AP and/or STA that is present in other BSS during the PSTT3 period and the PSTT4 period or the STA that is present in the same BSS but is not aware of whether PST is initiated. Accordingly, the AP and/or STAs may occupy subband4 to initiate frame transmission and reception. The AP does not assign subband4 to the STAs during the subsequent PSTT5 and PSTT6 periods, and thus, occupancy of subband4 by other AP and/or STAs does not influence, as interference, STAs performing frame transmission and reception based on the PST.

Further, during the PSTT5 period, other AP and/or STA may recognize subband3 as idle mode. Accordingly, the other AP and/or STAs may occupy subbands 3 and 4 to initiate frame transmission and reception. The AP does not assign subbands 3 and 4 to the STAs during the PSTT6 period and thus occupancy of subbands 3 and 4 by the other AP and/or STAs does not interfere with STAs performing frame transmission and reception based on the PST.

Additionally, upon scheduling PST, the AP first assigns subbands and PSTT periods to STAs supporting a broad channel bandwidth and assigns the remaining subband to STAs supporting a narrow bandwidth so that frames may be transmitted and received at the same time. In such case, the subbands assigned to the STAs supporting the broad bandwidth are positioned away from the primary subband, and at least one subband assigned to the STAs supporting the narrow bandwidth may be the primary subband and be close to the primary subband. By doing so, more STAs may send frames during a certain PSTT period. Such PST scheduling-based frame transmission and reception method may be carried out as shown in FIG. 10.

Figure 10:
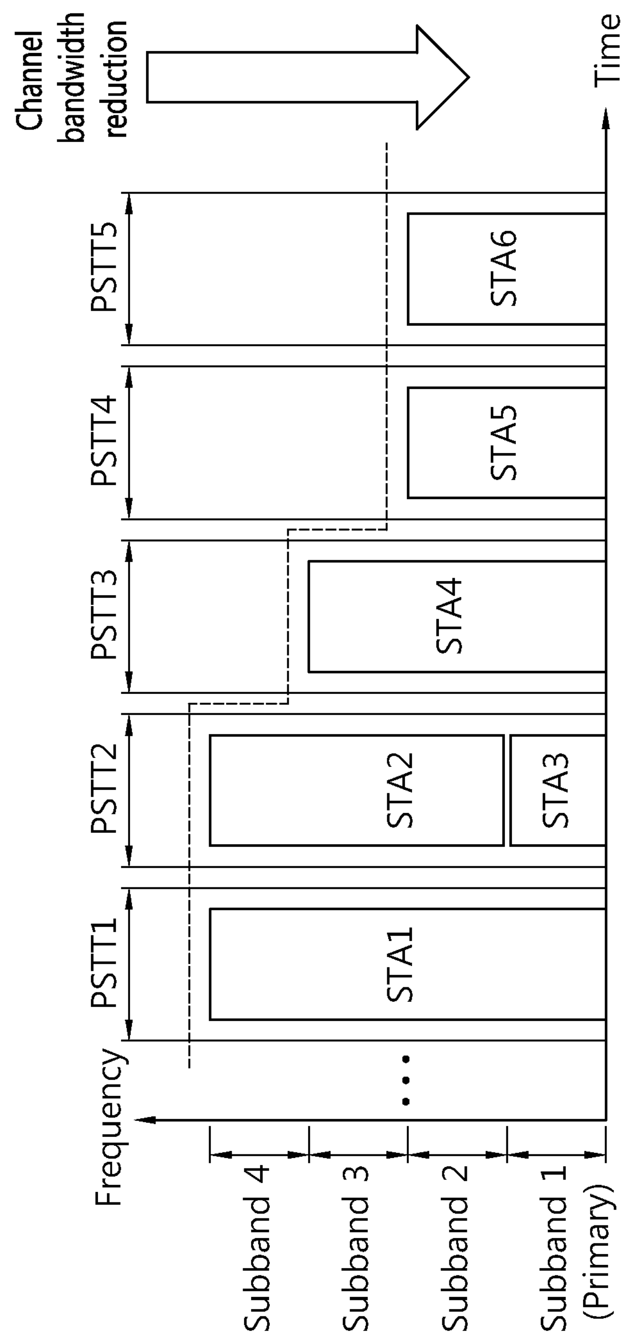
FIG. 10 is a view illustrating another example PST-based frame transmission and reception method according to an embodiment of the present invention.

FIG. 10 is a view illustrating another example PST-based frame transmission and reception method according to an embodiment of the present invention. STA1 supports a channel bandwidth according to four subbands. STA2 and STA3 support a channel bandwidth according to three subbands. STA3 supports a channel bandwidth according to one subband. STA5 and STA6 support a channel bandwidth for two subbands.

Referring to FIG. 10, STA1 supportive of the broadest channel bandwidth is assigned subbands 1 to 4, and STA1 is assigned a PSTT1 period.

STA2 supportive of a channel bandwidth for three subbands is assigned subbands 2 to 4 away from the primary subband, subband1, and STA2 is assigned a PSTT2 period. Meanwhile, the remaining subband1 is assigned to STA3 supportive of a channel bandwidth according to one subband, and STA3 is assigned a PSTT2 period.

STA4 supportive of a channel bandwidth for three subbands is assigned subbands 1 to 3 including the primary subband, together with a PSTT3 period because there is no STA to be assigned the remaining subbands after three subbands are assigned to STA4.

STA5 and STA6 supportive of a channel bandwidth for two subbands may be assigned two subbands. However, in case STA5 and STA6 are assigned the same PSTT period, the overall channel bandwidth increases, and thus, such assignment is not allowed. Accordingly, STA5 and STA6 are assigned a PSTT4 period and a PSTT5 period, respectively, together with subbands 1 and 2.

Figure 11:
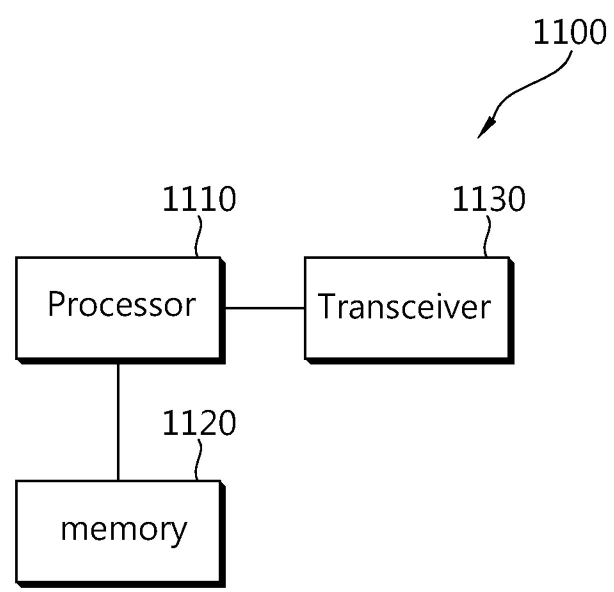
FIG. 11 is a block diagram illustrating a wireless device in which an embodiment of the present invention may be implemented.

FIG. 11 is a block diagram illustrating a wireless device in which an embodiment of the present invention may be implemented.

Referring to FIG. 11, the wireless device 1100 includes a processor 1110, a memory 1120, and a transceiver 1130. The transceiver 1130 transmits and/or receives radio signals and implements an IEEE 802.11 physical layer. The processor 1110 may be configured to be operatively connected with the transceiver 1130. The processor 1110 may be configured to perform PST scheduling according to an embodiment of the present invention. The processor 1110 may be configured to generate a PST frame and/or a PST information element according to an embodiment of the present invention and send the frame and element. The processor 1110 may be configured to receive the transmitted PST frame and/or PST information element and perform frame transmission and reception based on the assigned subband and PSTT period. The processor 1110 may be configured to implement embodiments of the present invention described above in connection with FIGS. 5 to 10.

The processor 1110 and/or the transceiver 1130 may include an ASIC (Application-Specific Integrated Circuit), other chipset, a logic circuit, and/or a data processing device. When an embodiment is implemented in software, the above-described scheme may be realized in a module (process or function) performing the above-described operation. The module may be stored in the memory 1120 and may be executed by the processor 1110. The memory 1120 may be included in the processor 1110 or may be positioned separately from the processor 1110 while operatively coupled with the processor 1110 via a known means.

Figure 12:
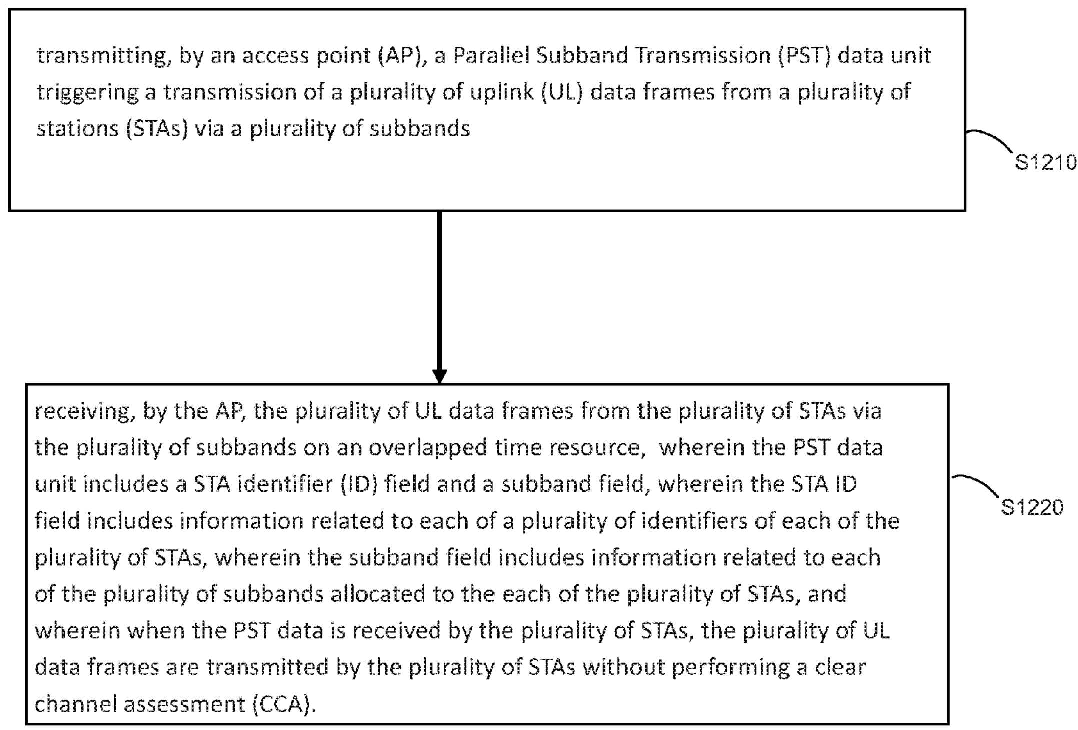
FIG. 12 is a flowchart showing a method of transmitting and receiving a frame in a wireless communication system.

FIG. 12 is a flowchart showing a method of transmitting and receiving a frame in a wireless communication system. Block S1210 shows transmitting, by an access point (AP), a Parallel Subband Transmission (PST) data unit triggering a transmission of a plurality of uplink (UL) data frames from a plurality of stations (STAs) via a plurality of subbands. Block S1220 shows receiving, by the AP, the plurality of UL data frames from the plurality of STAs via the plurality of subbands on an overlapped time resource, wherein the PST data unit includes a STA identifier (ID) field and a subband field, wherein the STA ID field includes information related to each of a plurality of identifiers of each of the plurality of STAs, wherein the subband field includes information related to each of the plurality of subbands allocated to the each of the plurality of STAs, and wherein when the PST data is received by the plurality of STAs, the plurality of UL data frames are transmitted by the plurality of STAs without performing a clear channel assessment (CCA).

Although in the above-described exemplary embodiments, methods are described based on flowcharts having a series of steps or blocks, the present invention is not limited to the order of the steps, and some steps may be conducted in a different order from other steps or simultaneously with the other steps. Further, it may be understood by one of ordinary skill in the art that the steps in the flowcharts do not exclude each other, and rather, other steps may be added thereto or some thereof may be removed therefrom without affecting the scope of the present invention.

What is claimed is:

1. A method of transmitting and receiving a frame in a wireless communication system, the method comprising:

transmitting, by an access point (AP), a Parallel Subband Transmission (PST) data unit triggering a transmission of a first uplink (UL) data frame from a first station (STA) and a second UL data frame from a second STA, the first STA supporting a first subband, a second subband and a third subband, and the second STA supporting a fourth subband;

receiving, by the AP, the first UL data frame from the first STA via the first subband, the second subband and the third subband during a first PST time (PSTT); and receiving, by the AP, the second UL data frame from the second STA via the fourth subband during the first PSTT, wherein the first subband, the second subband and the third subband are positioned away from a primary subband, wherein the fourth subband is the primary subband or close to the primary subband, wherein the PST data unit includes a STA identifier (ID) field and a subband field, wherein the STA ID field includes information related to identifiers of the first STA and the second STA, wherein the subband field includes information related to the first subband, the second subband and the third subband allocated to the first STA and the fourth subband allocated to the second STA, and wherein when the PST data unit is received by the first STA and the second STA, the first UL data frame and the second UL data frame are transmitted by the first STA and the second STA without performing a clear channel assessment (CCA).

2. The method of claim 1, wherein the PST data unit further includes a transmission timing field, wherein the transmission timing field includes transmission offset information, transmission duration information and information related to a time resource for transmission of the first UL data frame and the second UL data frame, wherein the transmission offset information includes information related to an interval between a time when the time resource is initiated and a time when the PST data unit is transmitted, and wherein the transmission duration information includes information related to a duration of the time resource.

3. The method of claim 1, wherein each of the first STA and the second STA operate in a sleep mode when the first PSTT is expired.

4. The method of claim 1, wherein the STA ID field is determined based on information related to buffered uplink data of the each of the first STA and the second STA, and wherein the subband field is determined based on an available number of subbands.

5. The method of claim 1, wherein bandwidths of the first subband, the second subband, the third subband and the fourth subband are the same.

6. A wireless device operating in a WLAN system, the wireless device comprising:

a transceiver configured to transmit and receive a frame; and a processor operatively connected to the transceiver and configured to:

transmit a Parallel Subband Transmission (PST) data unit triggering a transmission of a first uplink (UL) data frame from a first station (STA) and a second UL data frame from a second STA, the first STA supporting a first subband, a second subband and a third subband, and the second STA supporting a fourth subband, receive the first UL data frame from the first STA via the first subband, the second subband and the third subband during a first PST time (PSTT), and receive the second UL data frame from the second STA via the fourth subband during the first PSTT, wherein the first subband, the second subband and the third subband are positioned away from a primary subband, wherein the fourth subband is the primary subband or close to the primary subband, wherein the PST data unit includes a STA identifier (ID) field and a subband field, wherein the STA ID field includes information related to identifiers of the first STA and the second STA, wherein the subband field includes information related to the first subband, the second subband and the third subband allocated to first STA and the fourth subband allocated to the second STA, and wherein when the PST data unit is received by the first STA and the second STA, the first UL data frame and the second UL data frame are transmitted by the first STA and the second STA without performing a clear channel assessment (CCA).

7. The wireless device of claim 6, wherein each of the first STA and the second STA operate in a sleep mode when the first PSTT is expired.

8. The wireless device of claim 6, wherein the STA ID field is determined based on information related to buffered uplink data of the each of the first STA and the second STA, and wherein the subband field is determined based on an available number of subbands.

9. The wireless device of claim 6, wherein the PST data unit further includes a transmission timing field, wherein the transmission timing field includes transmission offset information, transmission duration information and information related to a time resource for transmission of the first UL data frame and the second UL data frame, wherein the transmission offset information includes information related to an interval between a time when the time resource is initiated and a time when the PST data unit is transmitted, and wherein the transmission duration information includes information related to a duration of the time resource.

10. The wireless device of claim 6, wherein bandwidths of the first subband, the second subband, the third subband and the fourth subband are the same.

* * * * *